US011851031B2

(12) United States Patent
Hornby et al.

(10) Patent No.: US 11,851,031 B2
(45) Date of Patent: Dec. 26, 2023

(54) VEHICLE CAMERA AND SENSOR WASHER MANIFOLD ASSEMBLY

(71) Applicant: Vitesco Technologies USA, LLC, Auburn Hills, MI (US)

(72) Inventors: Michael J Hornby, Williamsburg, VA (US); Steven Paul Nowinski, Shelby Township, MI (US); Michael J Zaitz, Royal Oak, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 17/719,094

(22) Filed: Apr. 12, 2022

(65) Prior Publication Data

US 2022/0234544 A1 Jul. 28, 2022

Related U.S. Application Data

(63) Continuation of application No. 16/418,660, filed on May 21, 2019, now abandoned.

(60) Provisional application No. 62/675,156, filed on May 22, 2018.

(51) Int. Cl.

*B60S 1/52* (2006.01)
*B60W 10/30* (2006.01)
*B60S 1/50* (2006.01)

(52) U.S. Cl.

CPC . *B60S 1/52* (2013.01); *B60S 1/50* (2013.01); *B60W 10/30* (2013.01)

(58) Field of Classification Search

CPC .......... B60S 1/52; B60S 1/481; F16K 27/003; F16K 31/0651

USPC .......................................................... 137/883

See application file for complete search history.

(56) References Cited

U.S. PATENT DOCUMENTS 3,552,436 A * 1/1971 Stewart .................. F16K 11/22 137/883
5,967,188 A * 10/1999 Chien-Chuan ........ F16K 27/003 137/861
2009/0090400 A1 4/2009 Burrows
2015/0183404 A1* 7/2015 Romack ................. B60S 1/485 239/284.1
2016/0326991 A1 11/2016 Seo

FOREIGN PATENT DOCUMENTS

CN 101795613 A 8/2010
CN 106122562 A 11/2016

OTHER PUBLICATIONS

Original and Translation of CN105443807A; Xu Zhengrong; Mar. 30, 2016.*

(Continued)

*Primary Examiner* — Paul J Gray

(57) ABSTRACT

A manifold assembly for a camera wash system of an autonomous vehicle is disclosed. The manifold assembly includes a fluid inlet; a plurality of fluid injectors, each fluid injector configured to switch between an open state in which fluid passes through the fluid injector and a closed state in which fluid does not pass through the fluid injector; a block member configured to hold the fluid injectors in a fixed position; and a rail member including a fluid passage in fluid communication between the fluid inlet and each fluid injector for providing a cleaning fluid to each of the fluid injectors.

18 Claims, 11 Drawing Sheets

70
64
68B
68
60
68A
70
10
68C
62
10
10
63
10
72
10
67
63
63
63
63

(56) References Cited

OTHER PUBLICATIONS

Chinese Office Action dated Jun. 22, 2006 for corresponding Patent Application No. 201980034143.5.

* cited by examiner

VEHICLE CAMERA AND SENSOR WASHER MANIFOLD ASSEMBLY

CROSS-REFERENCE TO RELATED APPLICATIONS

This U.S. patent application is a continuation of, and claims priority under 35 U.S.C. § 120 from, U.S. patent application Ser. No. 16/418,660, filed on May 21, 2019, which claims priority under 35 U.S.C. § 119(e) to U.S. Provisional Application No. 62/675,156, filed on May 22, 2018. The disclosures of these prior applications are considered part of the disclosure of this application and are hereby incorporated by reference in their entireties.

TECHNICAL FIELD

The present invention is directed to a manifold assembly, and particularly to a manifold assembly of a system for washing the cameras and/or sensors of a motor vehicle, such as a vehicle having autonomous driving functionality.

BACKGROUND

As autonomous vehicle development continues to progress with various sensors and cameras around the exterior of the vehicle, a need has arisen for keeping the lenses of these sensors and cameras clean in order to function properly. Accordingly, there is an increased need for a washing system that effectively and robustly provides a desired amount of fluid to any of the sensors and cameras of the autonomous vehicle.

SUMMARY

According to an example embodiment, there is disclosed a manifold assembly for a camera wash system of an autonomous vehicle. The manifold assembly includes a fluid inlet and a plurality of fluid injectors, each fluid injector configured to switch between an open state in which fluid passes through the fluid injector and a closed state in which fluid does not pass through the fluid injector. A block member is configured to hold the fluid injectors in a fixed position. A rail member includes a fluid passage in fluid communication between the fluid inlet and each fluid injector for providing a cleaning fluid to each of the fluid injectors.

The block member includes a plurality of apertures, each aperture receiving a portion of a fluid injector therein. The manifold assembly further includes a plurality of fluid outlets, each fluid outlet extending from the block member and is in fluid communication with a corresponding aperture of the block member and fluid injector received therein. The fluid inlet, the rail member, the fluid injectors and the fluid outlets form a plurality of fluid paths through the manifold assembly.

The fluid outlets may be integrally formed as a unitary member with the block member. Alternatively, each fluid outlet is mechanically attached to and forms part of a corresponding fluid injector. In another alternative embodiment, each fluid outlet is attached to and extends from the block member.

The fluid inlet forms part of the rail member. The rail member further includes a plurality of cup members, each cup member receives therein a fluid inlet portion of a fluid injector. The fluid passage is in fluid communication with the fluid inlet and each cup member. The manifold assembly further includes a fluid outlet, wherein the fluid inlet and the fluid outlet are formed as part of the rail member. The fluid passage is in fluid communication between the fluid inlet and the fluid outlet.

The manifold assembly further includes at least one fastener coupled to the rail member and the block member. The at least one fastener connects the rail member to the block member. The manifold assembly may further include at least one spacer disposed between the rail member and the block member and surrounding the at least one fastener. The rail member is attached to the block member at a predetermined distance therefrom.

The manifold assembly further includes at least one through-hole defined in the block member. The at least one through-hole allows for attachment of the manifold assembly within a vehicle.

DESCRIPTION OF DRAWINGS

The present invention will become more fully understood from the detailed description and the accompanying drawings, wherein.

DETAILED DESCRIPTION

Figure 1:
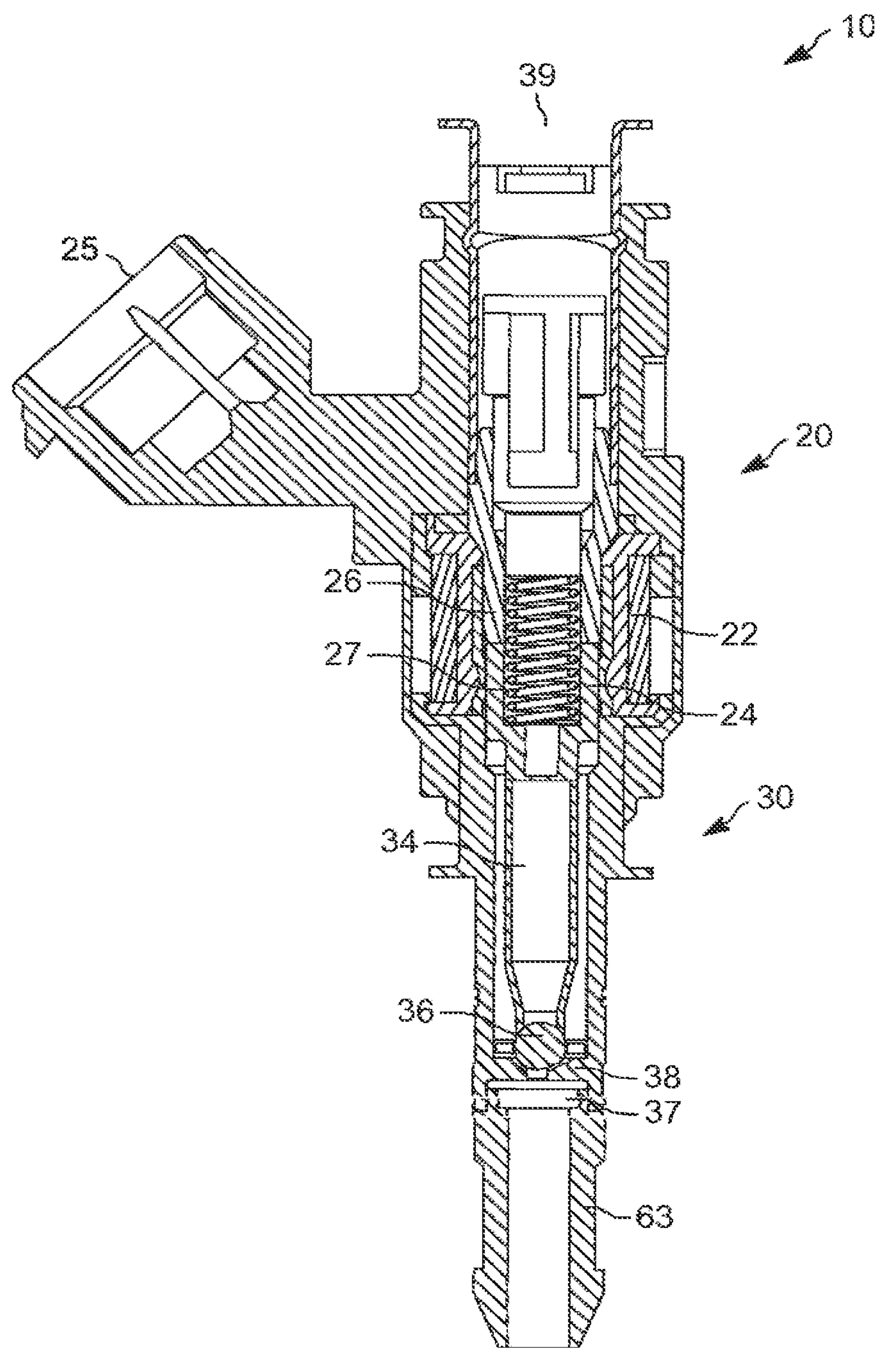
FIG. 1 is a cross sectional side view of a fluid injector for use in a vehicle camera/sensor washing system.
Figure 2:
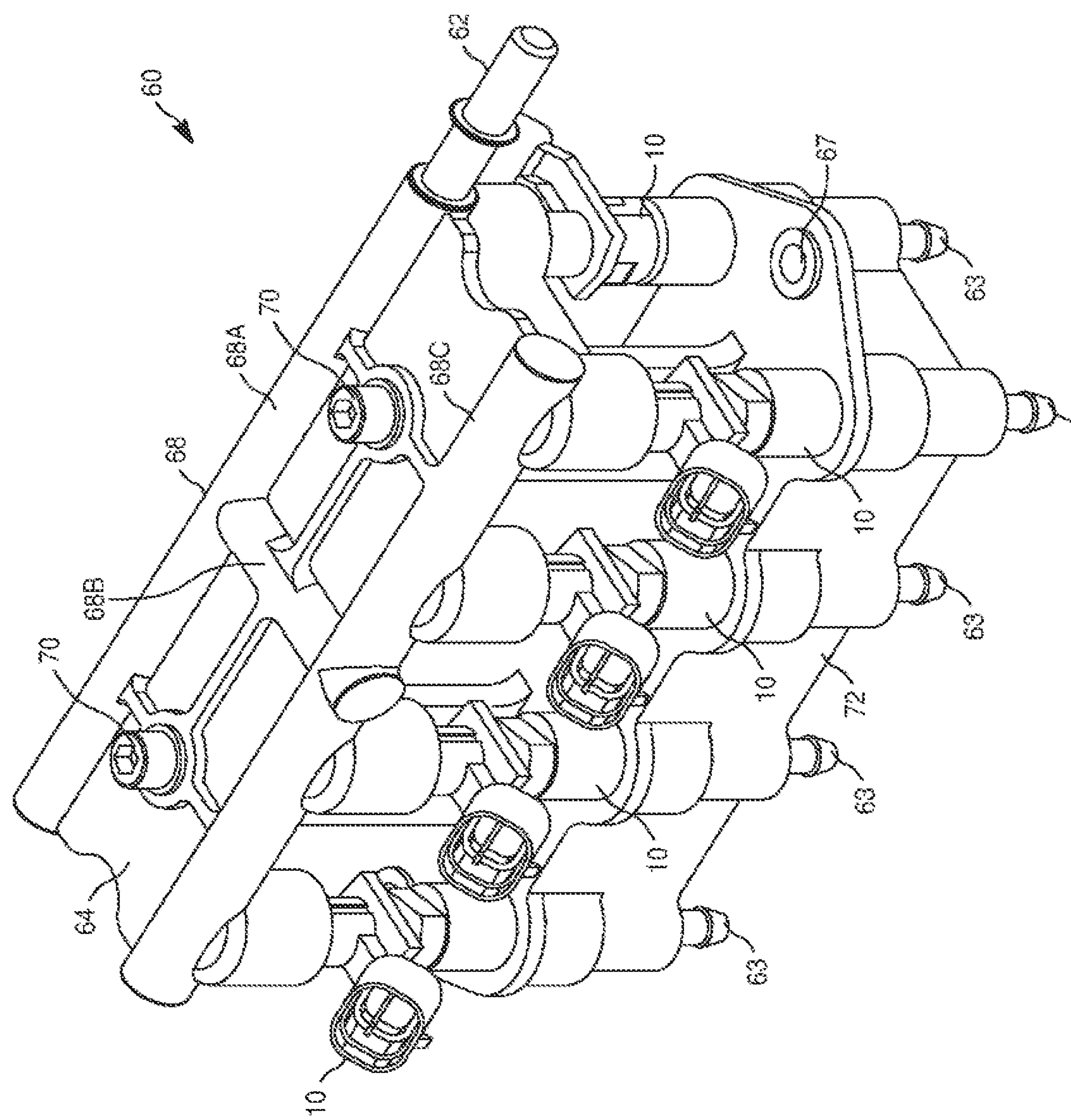
FIG. 2 is a perspective view of a manifold assembly for a vehicle camera/sensor washing system using the fluid injector of FIG. 1, according to an example embodiment.
Figure 3:
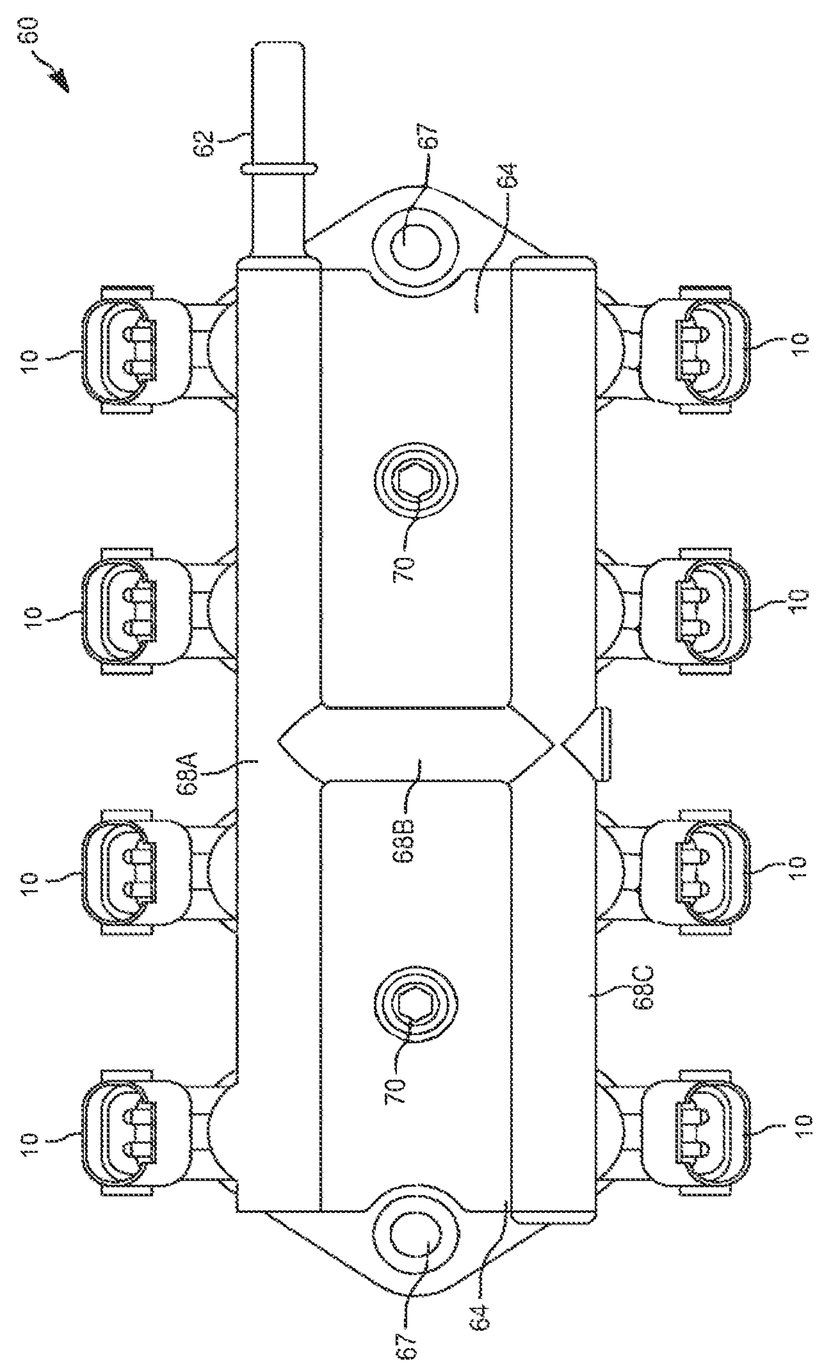
FIG. 3 is a top view of the manifold assembly of FIG. 2.
Figure 4:
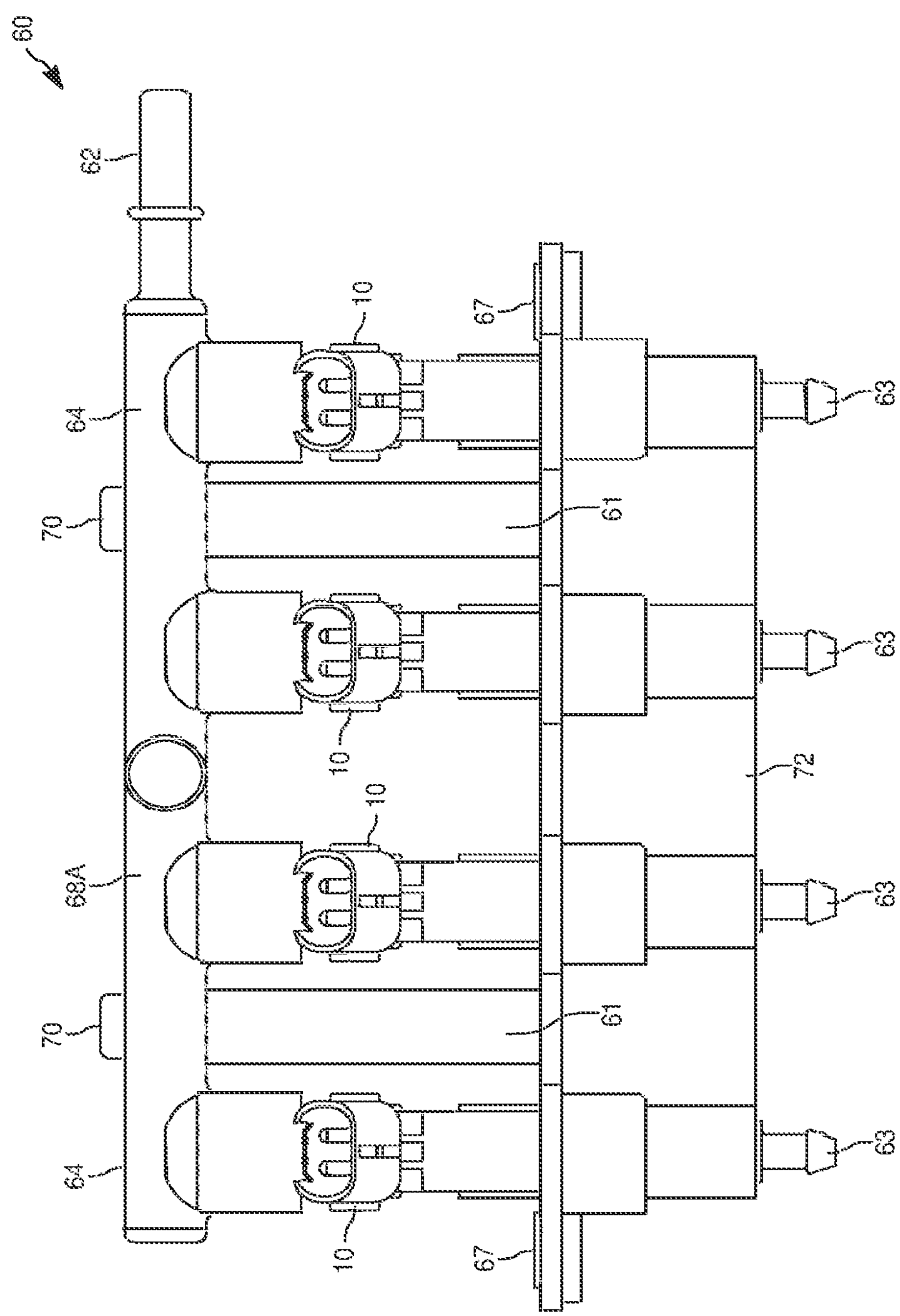
FIGS. 4 and 5 are elevational side views of the manifold assembly of FIG. 2.
Figure 5:
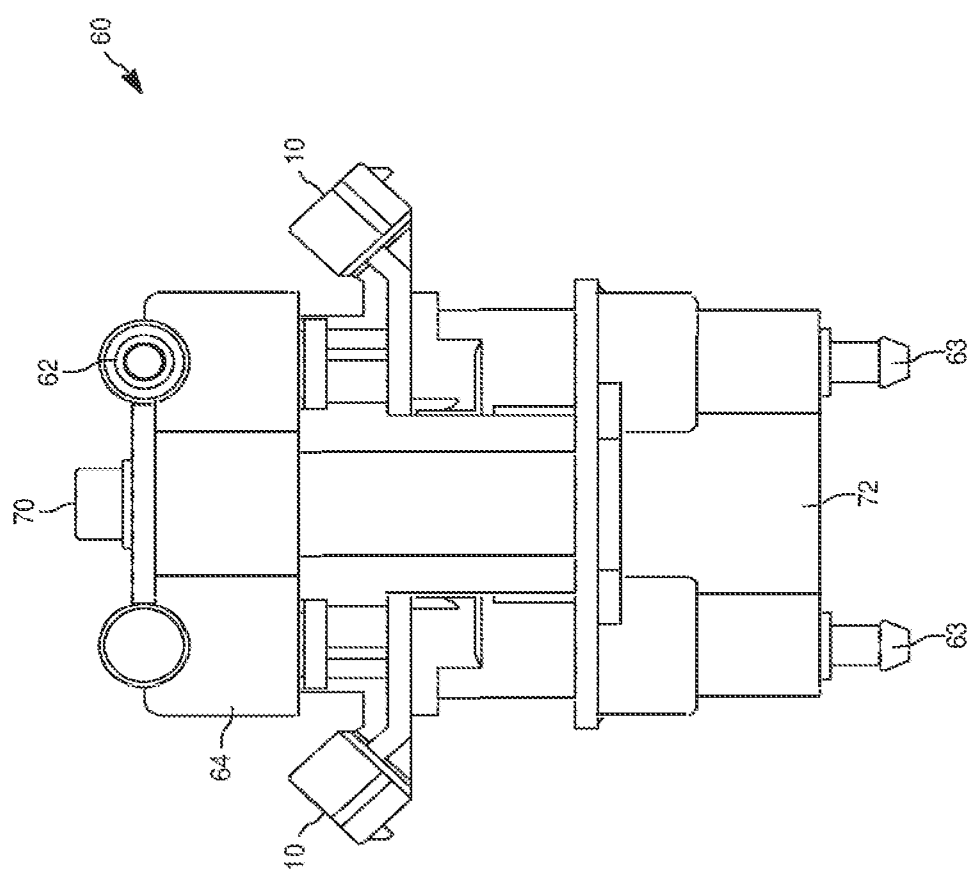

In the figures and throughout the detailed description, the same reference numbers are used to identify identical or similar elements. For the sake of clarity, the elements are not shown to scale unless otherwise specified.

In general terms, example embodiments of the present disclosure are directed to a manifold assembly of a wash systems for camera and sensors of autonomous vehicles. The manifold assembly is disposed within the vehicle, such as under the vehicle's hood, and in fluid communication between a source of washing fluid and exit ports of the wash system which discharge the washing fluid towards a plurality of the vehicle's cameras and sensors. The fluid may be a liquid, such as water or a water-based solution, or a gas, such as air. The wash system may also include a reservoir for holding water or other wash fluid; a pump which pumps fluid from the reservoir under pressure to the manifold assembly; an electronics control unit which controls the manifold assembly to selectively discharge the pressurized fluid from the manifold assembly to any one of a plurality of exit ports in fluid communication with the fluid outlets of the manifold assembly, each of the exit ports being disposed in proximity with a camera or sensor of the vehicle. In this way, the manifold assembly serves to selectively provide and distribute washing fluid to the externally-facing cameras and sensors of a motor vehicle.

Referring to FIGS. 2-9, there is shown a manifold assembly 60 according to an example embodiment. Manifold assembly 60 is configured to be part of the camera/sensor wash system for a motor vehicle, between a source of washing fluid and the exit ports of the wash system, and particularly between a fluid pump on an upstream side and the exit ports on a downstream side of the wash system.

Manifold assembly 60 includes an inlet 62 disposed at one longitudinal end of the assembly and configured to receive, either directly or indirectly, fluid from a source of washing fluid to be used to wash exterior-facing cameras and sensors of a motor vehicle, such as the cameras and sensors which provide autonomous control functionality. Manifold assembly 60 further includes a plurality of outlets 63 which selectively provide washing fluid received at inlet 62.

In an example embodiment, manifold assembly 60 includes a plurality of fluid injectors 10. Fluid injectors 10, seen in FIGS. 1 and 2, may each be any fluid injector, such as a fuel injector, a fluid injector for a reductant or diesel dosing unit, etc. In the example embodiments, each fluid injector 10 is a solenoid-activated injector in which the solenoid is controlled to open and close the injector valve of the fluid injector. In this way, manifold assembly 60, by selectively opening and closing the valves of fluid injectors 10, allow for autonomous vehicle was system to provide washing fluid to the lens or other assembly of a chosen camera or sensor in precisely controlled amounts. Fluid injectors 10 may be individually controlled, i.e., opened and closed, by an electronics unit of the autonomous vehicle, or may be collectively controlled.

FIG. 1 illustrates fluid injector 10 according to an example embodiment. Fluid injector includes an actuator unit 20 including a coil 22, stationary pole piece 26, spring 27 and movable armature 24. Passing an electric current through coil 22 creates an electromagnetic force which causes armature 24 to move towards pole piece 26, against the bias force presented by spring 27. Removal of the electric current causes armature 24 to move away from pole piece 26 due to the spring force from spring 27.

Fluid injector further includes a valve assembly 30. Armature 24 is connected to a valve needle 34 of the valve assembly having a closing element 36 disposed at an end portion of the needle. A valve seat 38 is disposed in fluid injector 10 at a downstream end portion thereof. Movement of armature 24 in a direction towards pole piece 26, due to passing current through coil 22, moves valve needle 34 so that closing element 36 becomes spaced apart from valve seat 38, thereby opening the valve assembly 30 of fluid injector 10 and allowing fluid to pass from a fluid inlet 39 of fluid injector 10 to a fluid outlet 37 thereof. Movement of armature 24 in a direction away from pole piece 26, due to the removal of current through coil 22 and responsive to the spring bias from spring 27, causes valve needle 34 to move so that closing element 36 sealingly engages with valve seat 38, thereby closing the valve assembly 30 and preventing fluid from flowing from fluid inlet 39 of fluid injector 10 to fluid outlet 37 thereof.

Figure 6:
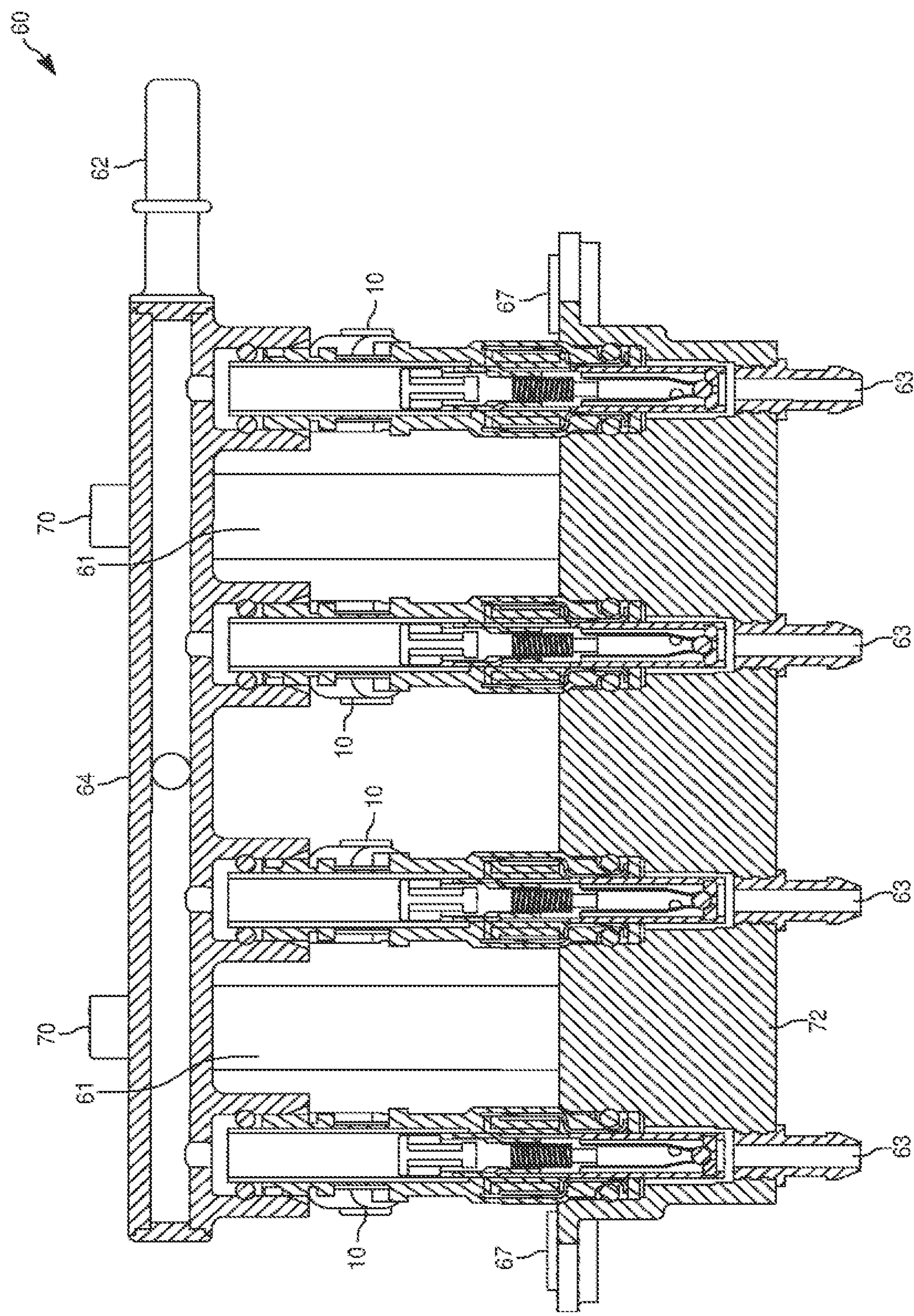
FIG. 6 is a cross sectional view of the manifold assembly of FIG. 2.
Figure 7:
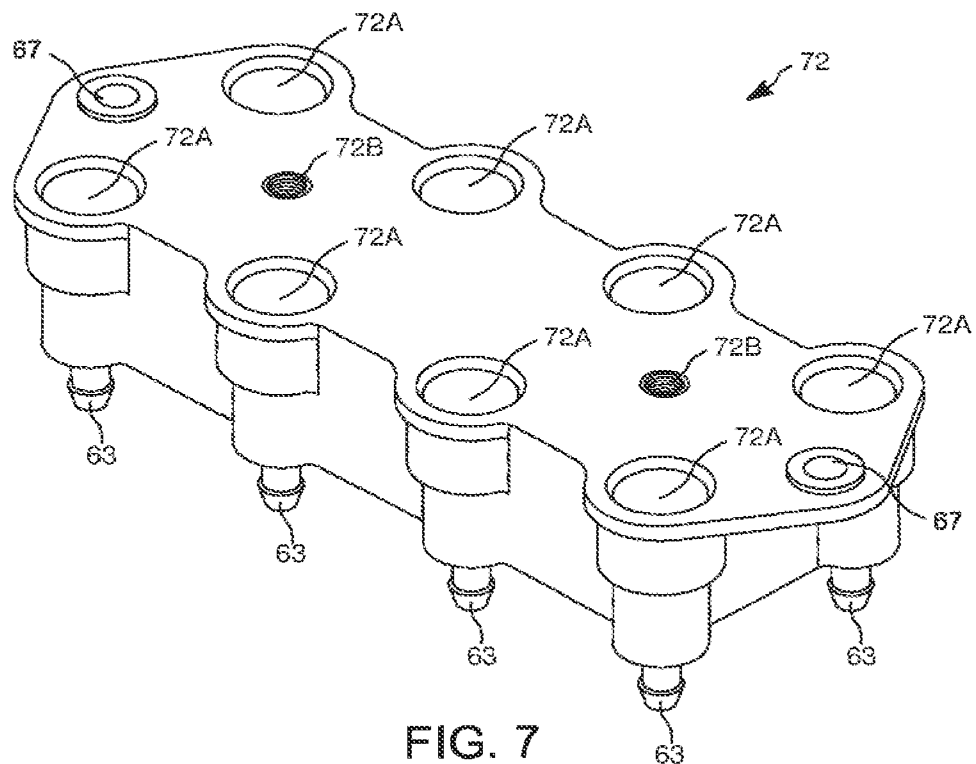
FIG. 7 is a perspective view of a block member of the manifold assembly of FIG. 2.
Figure 8:
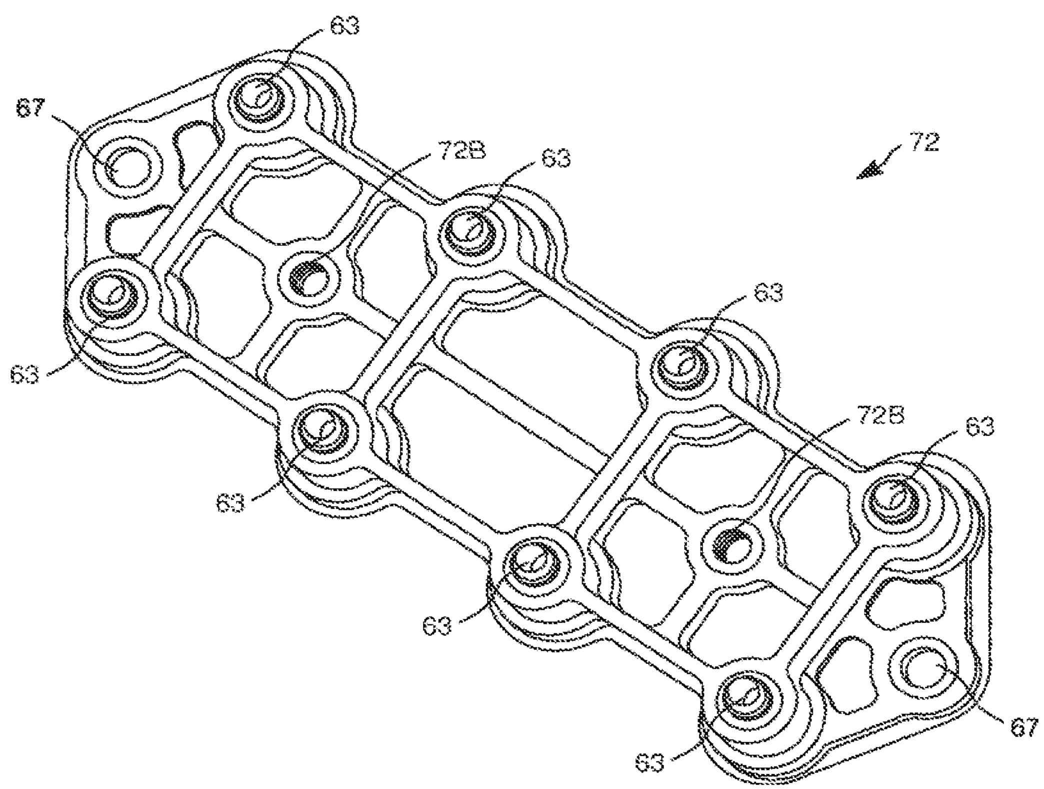
FIG. 8 is a perspective bottom view of the block member of FIG. 7.
Figure 9:
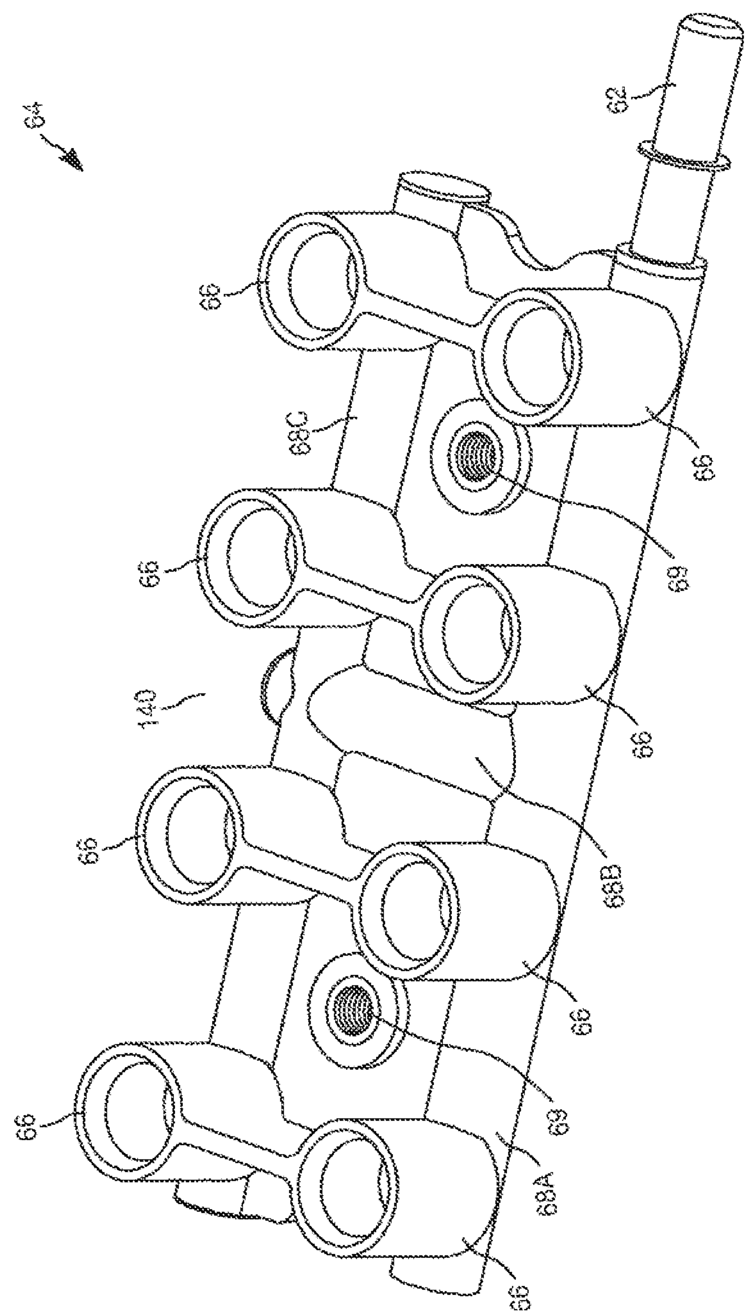
FIG. 9 is a bottom perspective view of a supply rail member of the manifold assembly of FIG. 2.

With continued reference to FIGS. 2-9, manifold assembly 60 includes a block member 72 which supports each fluid injector 10 in a fixed position. Block member 72 may be constructed from plastic, such as molded plastic, metal, fiberglass or the like. Block member 72 includes a plurality of apertures 72A defined therein. Referring to FIGS. 7 and 8, each aperture 72A is sized and shaped for receiving at least partly therein a fluid injector 10. Each aperture 72A receives a downstream portion of a fluid injector 10, relative to a direction of fluid flow through the injector. In the illustrated example embodiment, block member 72 includes eight apertures 72A for holding up to eight fluid injectors 10, but it is understood that block member 72 may be configured to hold a different number of apertures 72A.

As shown in FIGS. 2-8, block member 72 further includes a plurality of fluid outlets 63 which extend or protrude from block member 72. Each fluid outlet 63 includes a through-hole for passing fluid discharged from a corresponding fluid injector 10. FIGS. 1-6 illustrate the positioning of fluid injectors 10 relative to a corresponding fluid outlet 63. In one example embodiment, each fluid outlet 63 is formed from a metal and is welded or otherwise secured to the outlet port of a corresponding fluid injector 10, as shown if FIG. 1. In another example embodiment, each fluid outlet 63 is integrally formed with block member 72 so as to form a unitary member therewith, such as by being formed with block member 72 as part of the same plastic molding process. In another example embodiment, each fluid outlet is attached or secured to block member 72.

Further, block member 72 includes a plurality of through-holes 67. In the illustrated example embodiment, a through-hole 67 is defined at and extends from the longitudinal end portions of block member 72. Through-holes 67 are sized for receiving a bolt or other fastener therein (not shown), for securing manifold assembly 60 within a vehicle.

Block member 72 may also include apertures 72B (FIGS. 7 and 8) defined at least partly therein. Apertures 72B are illustrated as being defined through block member 72, but it is understood that apertures 72B may be defined only partly through the block member. Apertures 72B may be defined along the longitudinal length of block member 72 and spaced apart from each other. Apertures 72A include a threaded inner surface for receiving a bolt or other fastener, as explained in greater detail below.

Manifold assembly 60 includes a rail member 64 which provides fluid communication between inlet 62 of the manifold assembly and the fluid inlet 39 of each fluid injector 10. Rail member 64 is constructed from a rigid material, such as plastic, metal, fiberglass or the like. Inlet 62 of manifold assembly 60 extends from an end portion, such as a longitudinal end portion, of rail member 64. A plurality of cup members 66 extend outwardly and are sized and shaped for receiving therein the inlet portion of a fluid injector 10. Cup member 66 forms a sealed engagement with a corresponding fluid injector 10 when the inlet port thereof is inserted in cup member 66.

In fluid communication between inlet 62 and cup members 66 of rail member 64 is a fluid passage 68. Passage 68 may be formed from a plurality of interconnected passage segments 68A-68D. In an example embodiment, a first passage segment 68A extends from inlet 62 at a first longitudinal end of rail member 64 and a second longitudinal end thereof, and provides fluid communication to a first group of cup members 66 (four cup members 66, as illustrated). A second passage segment 68B extends from first passage segment 68A in a lateral direction along rail member 64. A third passage segment 68C extends in parallel with first passage segment 68A between longitudinal end portions of rail member 64, and is in fluid communication with a second group of (four) cup members 66. Second passage segment 68B is disposed between and is fluidly connected to first passage segment 68A and third passage segment 68C. As shown, second passage segment 68B is disposed along a middle section of rail member 64, resulting in fluid passage 68 forming an H-shape. It is understood, however, that fluid passage 68 may have other shapes. For example, second passage segment 64B may extend in a lateral direction along a longitudinal end portion of rail member 64, resulting in fluid passage 68 have a largely C-shape.

Rail member 64 may further include one or more through-bores 69. Best seen in FIG. 9, through-bores 69 are spaced apart from each other and disposed substantially evenly along rail member 64 in a longitudinal direction. Through-bores 69 are sized for allowing a bolt 70 or other fastener to be inserted therein and to threadingly engage with an aperture 72B so that rail member 64 may be secured to block member and thereby hold fluid injectors 10 in a stable, fixed position within manifold assembly 60. As shown, spacers 61 surround bolts 70 and are disposed between block member 72 and rail member 64 to provide a fixed spacing therebetween.

FIG. 6 illustrates a cross-section of manifold assembly 60 along one group of fluid injectors 10. Here, the fluid inlet of each fluid injector 10 is disposed within the inner cavity of a corresponding cup member 66 and forms a sealed connection therewith using an O-ring or the like. As shown, each cup member 66 includes an additional (fourth) passage segment 68D that extends from first passage segment 68A (or third passage segment 68C) to the cup inner cavity so as to provide fluid communication in between.

FIG. 7 illustrates an expanded manifold assembly or system 100 according to another example embodiment. In this embodiment, manifold system 100 is a modular assembly in which a plurality of manifold assemblies 60 are in fluid communication with each other. Depicted in FIGS. 7-12, each manifold assembly 60 includes a rail member 64 having a fluid inlet 62, as discussed above, and also includes a fluid outlet 65 which allows for manifold assemblies 60 to be in fluidly connected to each other in a cascaded arrangement. Tubing 118, which in this case is flexible tubing of a rubber composition or the like, is connected between manifold assemblies 60, with each tubing or tube member 118 being coupled between the fluid outlet 65 of one manifold assembly 60 and the fluid inlet 62 of the next manifold assembly 60 in the cascaded chain of manifold assemblies 60. This manifold system 100 advantageously allows for manifold assemblies 60 to be spaced apart in the motor vehicle as needed in order to effectively provide wash fluid to cameras and/or sensors disposed around the vehicle. The one manifold assembly 60 appearing at the end of the cascaded chain of manifold assemblies 60 may include a fluid outlet 65 having a plug sealingly engaged therewith or may optionally not include a fluid outlet 65.

Figure 10:
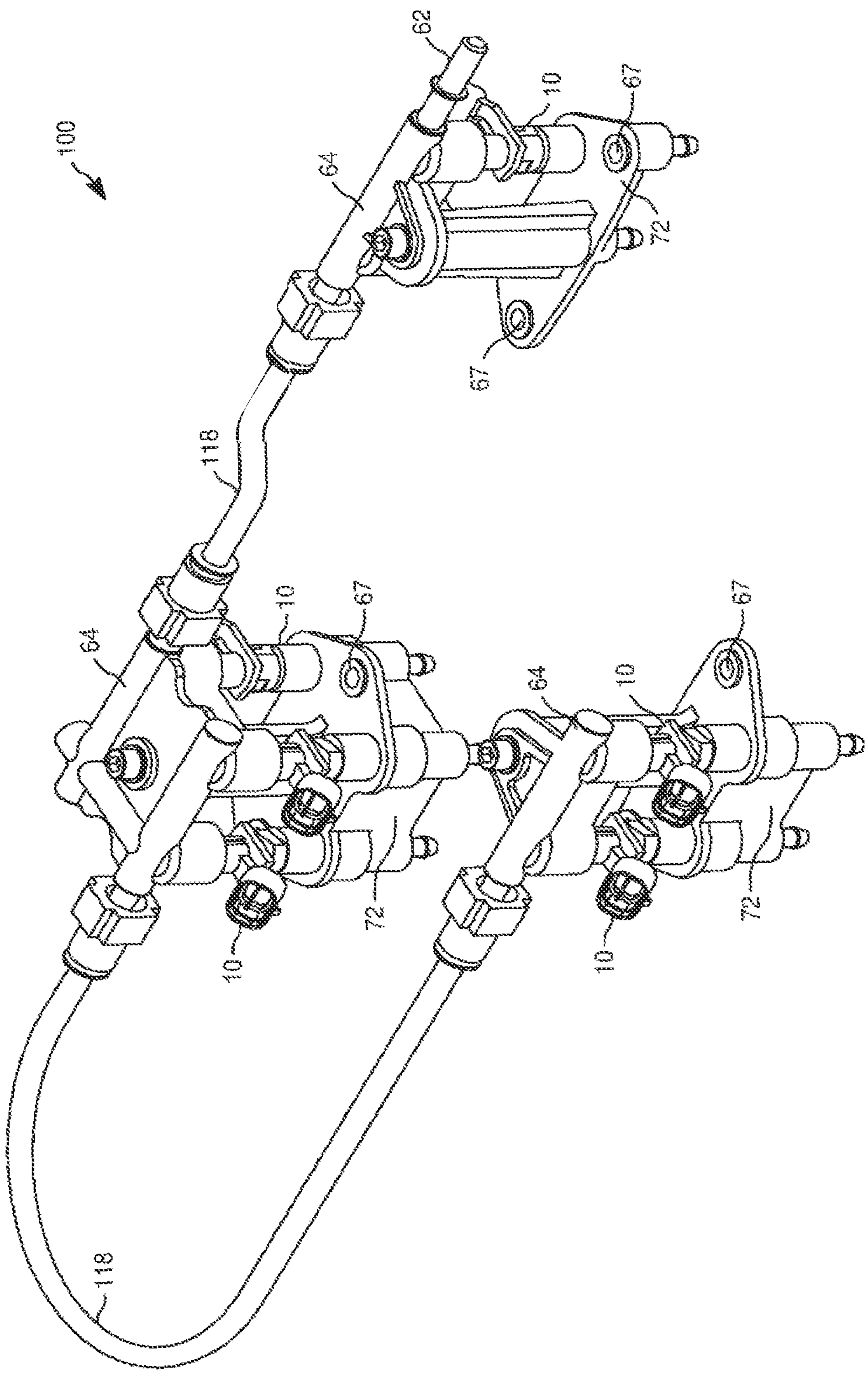
FIG. 10 is a perspective view of a manifold system according to an example embodiment.
Figure 11:
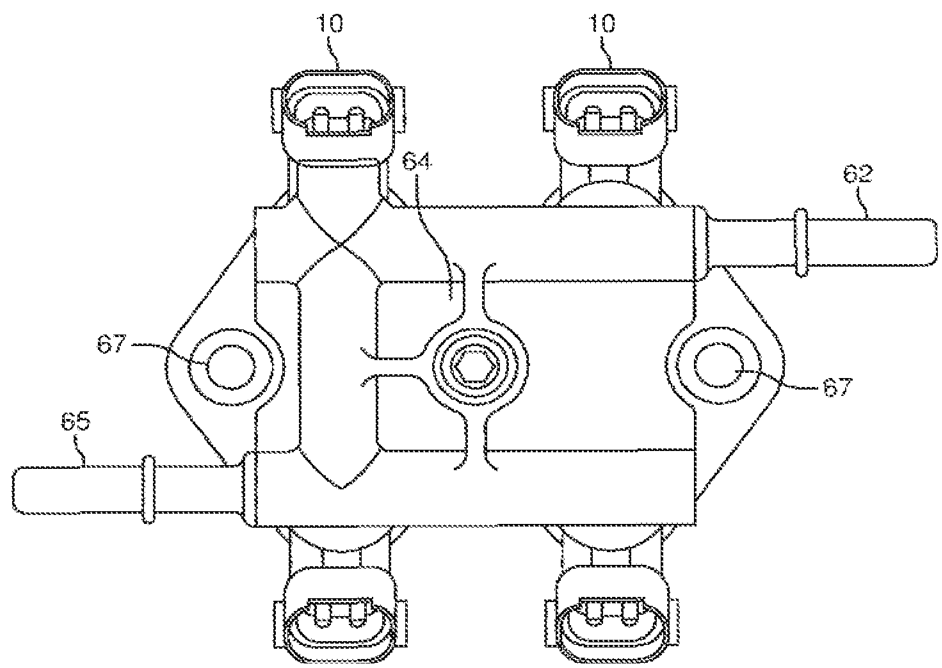
FIGS. 11 and 12 are top and side views, respectively, of a manifold assembly in FIG. 10.
Figure 12:
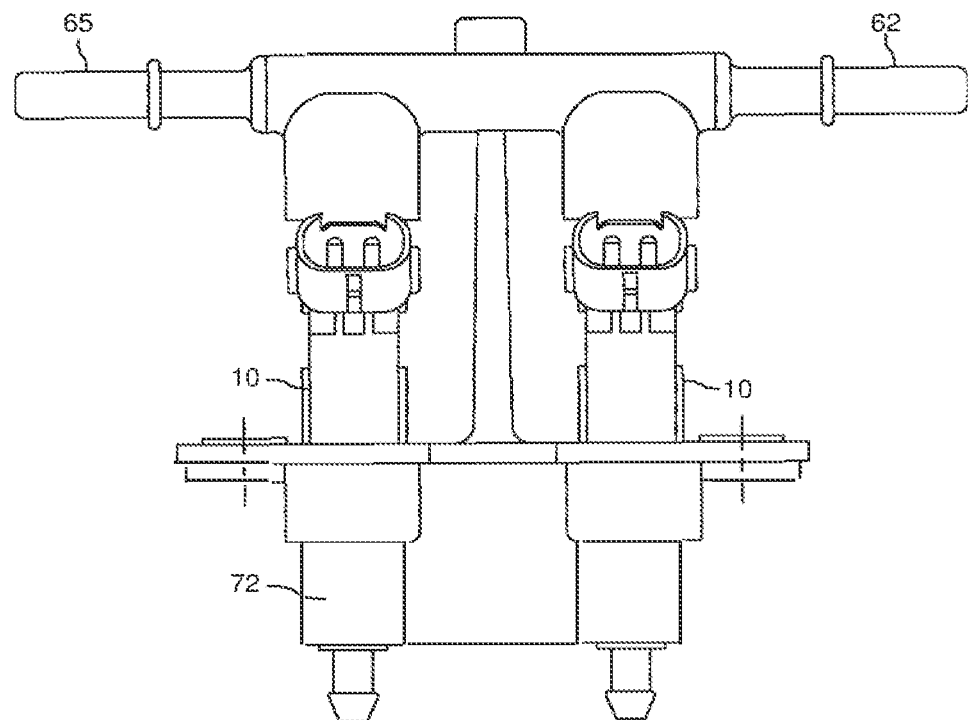
Figure 13:
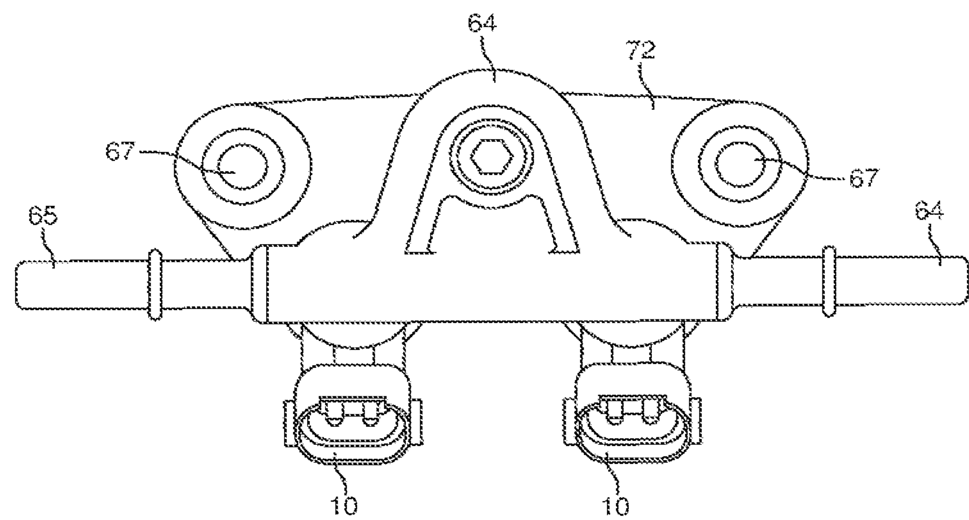
FIGS. 13 and 14 are top and side views, respectively, of another manifold assembly depicted in FIG. 10.
Figure 14:
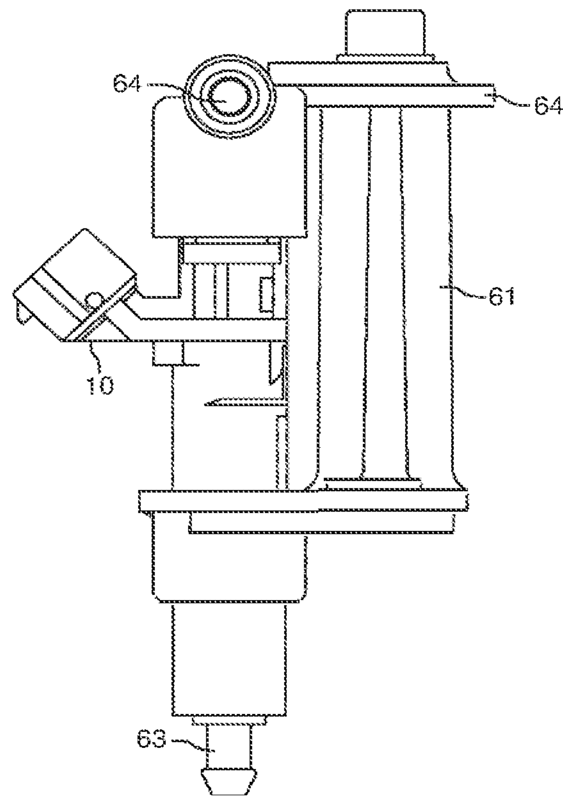

Expanded manifold system 100 illustrated in FIG. 10 shows manifold assemblies 60 with different numbers of fluid injectors 10 associated therewith. FIGS. 11 and 12 illustrate top and side plan views, respectively, of the four-injector manifold assembly 60 appearing in FIG. 10. FIGS. 13 and 14 illustrate top and side plan views, respectively, of a two-injector manifold assembly appearing in FIG. 10.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A manifold assembly for a camera wash system of an autonomous vehicle, comprising:

a fluid inlet;

a plurality of fluid injectors, each fluid injector configured to switch between an open state in which fluid passes through the fluid injector and a closed state in which fluid does not pass through the fluid injector;

a block member configured to hold the fluid injectors in a fixed position, the block member includes a plurality of apertures, each aperture receiving a portion of a fluid injector therein;

a rail member including a fluid passage in fluid communication between the fluid inlet and each fluid injector for providing a fluid to each of the fluid injectors, the fluid passage comprising a first passage segment extending from the fluid inlet at a first longitudinal end of the rail member and a second passage segment extending parallel to the first passage segment at a second longitudinal end of the rail member;

at least one fastener coupled to the rail member and the block member, the at least one fastener is arranged to connect the rail member to the block member; and a plurality of fluid outlets, each fluid outlet extending from the block member and in fluid communication with a corresponding aperture of the block member and fluid injector received therein, the fluid inlet, the rail member, the fluid injectors and the fluid outlets forming a plurality of fluid paths through the manifold assembly, wherein each fluid injector is a single unitary component that is removably disposed within the block member and the rail member and is a separate component from the block member and the rail member, the single unitary component being individually removable from the block member and the rail member, and wherein for each fluid injector, when the fluid injector is in the closed state, fluid cannot pass through the fluid outlet corresponding to the fluid injector.

2. The manifold assembly of claim 1, wherein the fluid outlets are integrally formed as a unitary member with the block member.

3. The manifold assembly of claim 1, wherein each fluid outlet is mechanically attached to and forms part of a corresponding fluid injector.

4. The manifold assembly of claim 1, wherein each fluid outlet is attached to and extends from the block member.

5. The manifold assembly of claim 1, wherein fluid only passes outwardly through each fluid outlet and does not pass inwardly into each fluid outlet.

6. The manifold assembly of claim 1, wherein the fluid inlet forms part of the rail member and the rail member further includes a plurality of cup members, each cup member receives therein a fluid inlet portion of a respective one of the plurality of fluid injectors.

7. The manifold assembly of claim 6, wherein the fluid passage is in fluid communication with the fluid inlet and each cup member.

8. The manifold assembly of claim 7, further comprising a fluid outlet, wherein the fluid inlet and the fluid outlet are formed as part of the rail member, and wherein the fluid passage is in fluid communication between the fluid inlet and the fluid outlet.

9. The manifold assembly of claim 1, further comprising at least one spacer disposed between the rail member and the block member and surrounding the at least one fastener, wherein each fluid injector is individually removable from the manifold assembly as the single unitary component upon the rail member being disconnected from the block member.

10. The manifold assembly of claim 1, wherein the rail member is attached to the block member at a predetermined distance therefrom.

11. The manifold assembly of claim 1, further comprising at least one through-hole defined in the block member, the at least one through-hole allowing for attachment of the manifold assembly within a vehicle.

12. The manifold assembly of claim 1, wherein each fluid injector comprises a valve assembly including a valve seat and a valve needle, an actuator unit operatively coupled to the valve needle of the valve assembly so that the actuator unit controls the valve needle to be moved between a first position spaced from the valve needle when the fluid injector is in the open state and a second position in which the valve needle contacts the valve seat when the fluid injector is in the closed state, the actuator unit and the valve assembly each comprising fluid injector parts, and an injector housing in which the parts of the valve assembly and the actuator unit are disposed, wherein the fluid injector, including the injector housing, is at least partly disposed in the block member and the rail member, wherein the valve needle and valve seat are fully enclosed within the injector housing and is not extendable therefrom.

13. A manifold system for providing fluid to cameras and sensors in a vehicle for washing the cameras and sensors, the manifold system comprising:

at least one manifold assembly, the at least one manifold assembly comprising:

a fluid inlet and a first fluid outlet;

a plurality of fluid injectors, each fluid injector configured to switch between an open state in which fluid passes through the fluid injector and a closed state in which fluid does not pass through the fluid injector;

a block member configured to hold the fluid injectors in a fixed position;

a rail member coupled between the fluid inlet and each fluid injector for providing a fluid received at the fluid inlet to each of the fluid injectors by way of a fluid passage, the fluid passage comprising a first passage segment extending from the fluid inlet at a first longitudinal end of the rail member and a second passage segment extending parallel to the first passage segment at a second longitudinal end of the rail member; and at least one fastener coupled to the rail member and the block member, the at least one fastener is arranged to connect the rail member to the block member, wherein each fluid injector is a single unitary component that is removably disposed within the block member and the rail member and is a separate component from the block member and the rail member, the single unitary component being individually removable from the block member and the rail member, wherein each at least one manifold assembly further comprises a plurality of second fluid outlets, each second fluid outlet extending from the block member and is in fluid communication with a corresponding aperture of the block member and fluid injector received therein, the fluid inlet, the rail member, the fluid injectors and the second fluid outlets forming a plurality of fluid paths through the manifold assembly, and wherein when the fluid injectors are in the closed state, fluid cannot pass through the second fluid outlets.

14. The manifold system of claim 13, wherein the at least one manifold assembly comprises a plurality of manifold assemblies, and the manifold system further comprises tubing coupled between the manifold assemblies, the tubing comprising a first tube member connected to and disposed between the first fluid outlet of a first manifold assembly of the plurality of manifold assemblies and the fluid inlet of a second manifold assembly of the plurality of manifold assemblies.

15. The manifold system of claim 13, wherein the block member of each at least one manifold assembly comprises a plurality of apertures, each aperture receiving a portion of a respective one of the plurality of fluid injectors therein.

16. The manifold system of claim 13, wherein the fluid inlet forms part of the rail member, the rail member further includes a plurality of cup members, each cup member receiving therein a fluid inlet portion of a respective one of the plurality of fluid injectors, and the rail member further includes the fluid passage from the fluid inlet to each cup member.

17. The manifold system of claim 13, wherein at least one spacer disposed between the rail member and the block member and surrounding the at least one fastener, wherein each fluid injector is individually removable from the manifold assembly as the single unitary component upon the rail member being disconnected from the block member.

18. The manifold system of claim 13, wherein each fluid injector comprises a valve assembly including a valve seat and a valve needle, an actuator unit operatively coupled to the valve needle so that the actuator unit controls the valve needle to be moved between a first position spaced from the valve needle when the fluid injector is in the open state and a second position in which the valve needle contacts the valve seat when the fluid injector is in the closed state, the actuator unit and the valve assembly each comprising fluid injector parts, and an injector housing in which the parts of the valve assembly and the actuator unit are disposed, wherein the fluid injector, including the injector housing, is at least partly disposed in the block member and the rail member, wherein the valve needle and the valve seat are fully enclosed within the injector housing and is not extendable therefrom.

* * * * *